United States Patent
Carlson

(10) Patent No.: US 6,181,525 B1
(45) Date of Patent: Jan. 30, 2001

(54) READ/WRITE HEAD WITH A LIMITED RANGE OF MOTION RELATIVE TO A LOAD BEAM

(75) Inventor: Carl J. Carlson, Pleasanton, CA (US)

(73) Assignee: Read-Rite Corporation, Fremont, CA (US)

( * ) Notice: Under 35 U.S.C. 154(b), the term of this patent shall be extended for 0 days.

(21) Appl. No.: 09/159,128

(22) Filed: Sep. 23, 1998

(51) Int. Cl.$^7$ .......................................................... G11B 5/48
(52) U.S. Cl. ........................................ 360/245.7; 360/245.9
(58) Field of Search ........................... 360/245.7, 245.9, 360/245.8, 234.5, 104, 108

(56) References Cited

U.S. PATENT DOCUMENTS

| | | |
|---|---|---|
| 3,665,434 | 5/1972 | Appleqist et al. . |
| 4,719,692 | 1/1988 | Sakai et al. . |
| 4,724,500 | 2/1988 | Dalziel . |
| 4,939,611 | 7/1990 | Connolly . |
| 5,185,683 * | 2/1993 | Oberg et al. . |
| 5,333,085 | 7/1994 | Prentice et al. . |
| 5,367,419 | 11/1994 | Kazama . |
| 5,557,488 | 9/1996 | Hamilton et al. . |
| 5,557,489 * | 9/1996 | Nakashima et al. . |
| 5,570,249 | 10/1996 | Aoyogi et al. . |
| 5,771,136 | 6/1998 | Girard . |
| 5,812,349 * | 9/1998 | Shouji et al. . |
| 5,815,349 * | 9/1998 | Frater . |
| 5,883,759 * | 3/1999 | Shulz . |
| 5,930,079 * | 7/1999 | Vera et al. . |
| 5,959,807 * | 9/1999 | Jurgenson . |
| 5,987,733 * | 11/1999 | Goss . |
| 5,995,326 * | 11/1999 | Thayne et al. . |
| 6,021,022 * | 2/2000 | Himes et al. . |
| 6,046,883 * | 4/2000 | Miller . |
| 6,052,259 * | 4/2000 | Mita et al. . |

FOREIGN PATENT DOCUMENTS

WO 99/41740 * 8/1999 (WO) .

OTHER PUBLICATIONS

K.R. Precision's brochure, 1998.

* cited by examiner

*Primary Examiner*—Craig A. Renner
(74) *Attorney, Agent, or Firm*—Samuel A. Kassatly

(57) ABSTRACT

A head gimbal assembly includes a suspension of the type supporting a slider and a flex circuit. The suspension is formed of a load beam that supports the flex circuit, and a resilient flexure which is secured to the load beam and which supports the slider. The load beam is comprised of a flexure portion that defines a rear motion limiter and that engages the flex circuit and limits the slider movement when the head gimbal assembly is exposed to a shock load. The rear motion limiter extends intermediate the flex circuit and the flexure. The flex circuit includes a flexure section which is separated from the rear motion limiter by a gap, such that under a shock load condition, the gap collapses for limiting the travel of the slider along a first direction. The front motion limiter can be formed of one or a plurality of tabs or wings that extend integrally from the load beam. According to another embodiment, the head gimbal assembly includes a front motion limiter that engages a cantilevered free end of the flexure for limiting the travel of the slider along a second direction.

19 Claims, 19 Drawing Sheets

READ/WRITE HEAD WITH A LIMITED RANGE OF MOTION RELATIVE TO A LOAD BEAM

BACKGROUND OF THE INVENTION

1. Field of the Invention

The present invention relates to disk drives and particularly to a load beam design that prevents damaging contact between a magnetic head slider and a magnetic medium due to shock loads applied to the disk drive. More specifically, the present invention relates to a load beam design for use with a flex circuit to limit the separation of the slider and the flexure from the load beam during a shock event, in order to increase the disk drive tolerance to shocks.

2. Description of Related Art

In a conventional disk drive, a read/write head is secured to a rotary actuator magnet and a voice coil assembly by means of a suspension and an actuator arm, and is positioned over a surface of a data storage disk. In operation, a lift force is generated by the aerodynamic interaction between the head and the disk. The lift force is opposed by a counteracting spring force applied by the suspension, such that a predetermined flying height is maintained over a full radial stroke of the rotary actuator assembly above the surface of the disk.

The suspension includes a load beam, a flexure secured to a cantilevered end of the load beam, and a slider resiliently mounted on the flexure. In order to permit pitch and roll movement of the slider to follow the disk surface fluctuations, the flexure is typically provided with a cantilevered tongue which is resiliently secured to the remainder of the flexure, and to which the slider is mounted. A dimple extends from either the load beam or the flexure tongue, to provide a point load about which the slider gimbals.

With the disk drive industry's heightened demand for increased robustness and tolerance to shock loads, it has become necessary to minimize damaging contact between the head slider and the disk, and also to prevent permanent deformation of any part of the suspension as a result of a shock load.

Mechanisms have been proposed for limiting the movement of the flexure for protection against damage under shock load conditions. One such mechanism is disclosed in U.S. Pat. No. 4,724,500 to Dalziel that describes a limiter that includes a pair of wing elements mounted on an opposite pair of raised shoulders of the slider assembly and an elongated support element mounted on the arm and terminating in an end portion disposed between the opposite wing elements and a central portion of the slider assembly, to limit the downward motion of the slider assembly away from the arm and the rotational motion of the slider assembly relative to the arm. This motion limiter structure is rather complicated in that an assembly of components is required, including the specially designed slider, and in that the structure adds significantly to the weight, height and difficulty of manufacture and assembly of the suspension. The added structure would be particularly undesirable in the design of smaller suspension assemblies.

Another motion limiter is disclosed in U.S. Pat. No. 5,333,085 to Prentice et al. that describes a tab which is attached to the head/slider assembly, such that when the gimbal is assembled to the load beam, the formed tab passes through an opening created for this purpose in the load beam, and extends beyond the opening far enough to prevent its returning through the opening after the gimbal and load beam are spot welded together. The tab/opening arrangement is such that shock forces will result in contact between the tab and the sides of the opening in the load thus preventing excessive motion of the gimbal. The Prentice et al. motion limiter requires special manufacturing and assembly steps. To assemble the flexure to the load beam, the tab must first be moved through the opening and then the flexure needs to be longitudinally shifted relative to the load beam to its mounting position. Moreover, the tab formation comprises multiple bends, the degree of each bend being critical in the definition of the spacing between the tab and the stop surface, and errors in the formation of the bends can significantly affect the ultimate spacing of the stop mechanism. Thus, the forming operation must be precisely controlled and monitored.

A further motion limiter is disclosed in U.S. Pat. No. 5,771,136 to Girard, which is incorporated herein by reference, and which describes a flexure having a cantilever portion provided with an integral limiter and stop surface. The limiter can be connected with the flexure by a 90-degree bend. The movement of the free-end of the cantilever portion in one direction will cause the limiter engagement surface to contact the stop surface of the flexure.

None of the conventional motion limiters described above specifically addresses the design concerns associated with the use of a flex circuit or flex circuit on suspension (FOS). K.R. Precision proposed a head design incorporating the FOS on one side of the suspension, along the central axis of the load beam, with conductive traces bent for connection to the slider. However, this routing of the FOS on the load beam seems to require a special suspension design, and might not provide suitable motion limiting function when is use with commonly available suspensions such as the Hutchinson 2030 type suspension.

SUMMARY OF THE INVENTION

The present invention is directed to a head gimbal assembly (HGA) load beam design for use with a FOS to limit the separation of the slider and the flexure from the load beam during a shock event, in order to increase the disk drive tolerance to shocks. The separation is limited at a trailing end to a gap between the FOS and an extension of the load beam, which extension acts as a rear motion limiter, and at a leading end by a front motion limiter. The present design enables a precise control of the head static attitude.

A significant feature of the present invention includes providing the load beam with a motion limiting function, which is relatively simple in construction and minimally susceptible to tolerance variations of the forming operation.

The foregoing and other features and advantages of the present invention can be achieved by a new head gimbal assembly design. The head gimbal assembly includes a suspension of the type supporting a slider and a flex circuit. The suspension is formed of a load beam that supports the flex circuit, and a resilient flexure which is secured to the load beam and which supports the slider. The load beam is comprised of a flexure portion that defines a rear motion limiter and that engages the flex circuit and limits the slider movement when the head gimbal assembly is exposed to a shock load. The rear motion limiter extends intermediate the flex circuit and the flexure.

The flex circuit includes a flexure section which is separated from the rear motion limiter by a preformed gap, such that under a shock load condition, the gap collapses for limiting the travel of the slider along a first direction. The front motion limiter can be formed of one or a plurality of tabs or wings that extend integrally from the load beam.

According to another embodiment, the head gimbal assembly includes a front motion limiter that engages a cantilevered free end of the flexure for limiting the travel of the slider along a second direction.

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar or identical elements. It should be understood that the sizes of the different components in the figures may not be in exact proportion, and are shown for visual clarity and for the purpose of explanation.

DETAILED DESCRIPTION OF THE INVENTION

Figure 1:
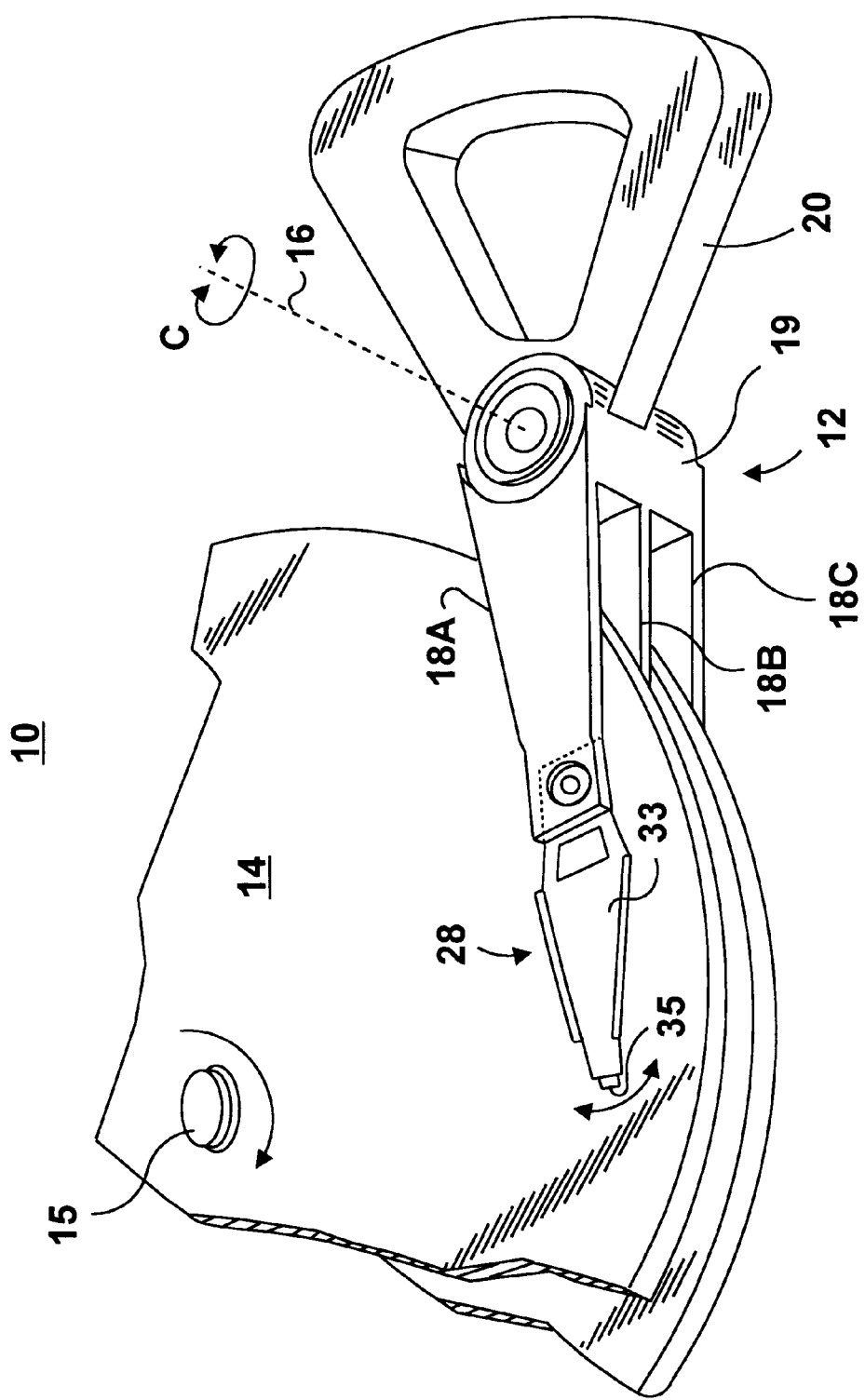
FIG. 1 is a fragmentary isometric view of a data storage system utilizing a load beam design incorporating a motion limiter according to the invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic voice coil (or rotor) 20 attached to the block 19 in a position diametrically opposite to the actuator arms 18A, 18B, 18C. A voice coil 20 cooperates with a stator (not shown) for rotating in an arc about the actuator axis 16. Energizing the voice coil 20 with a direct current in one polarity or the reverse polarity causes the head stack assembly 12, including the actuator arms 18A, 18B, 18C, to rotate about the actuator axis 16, in a direction substantially radial to the disks 14.

Figure 2:
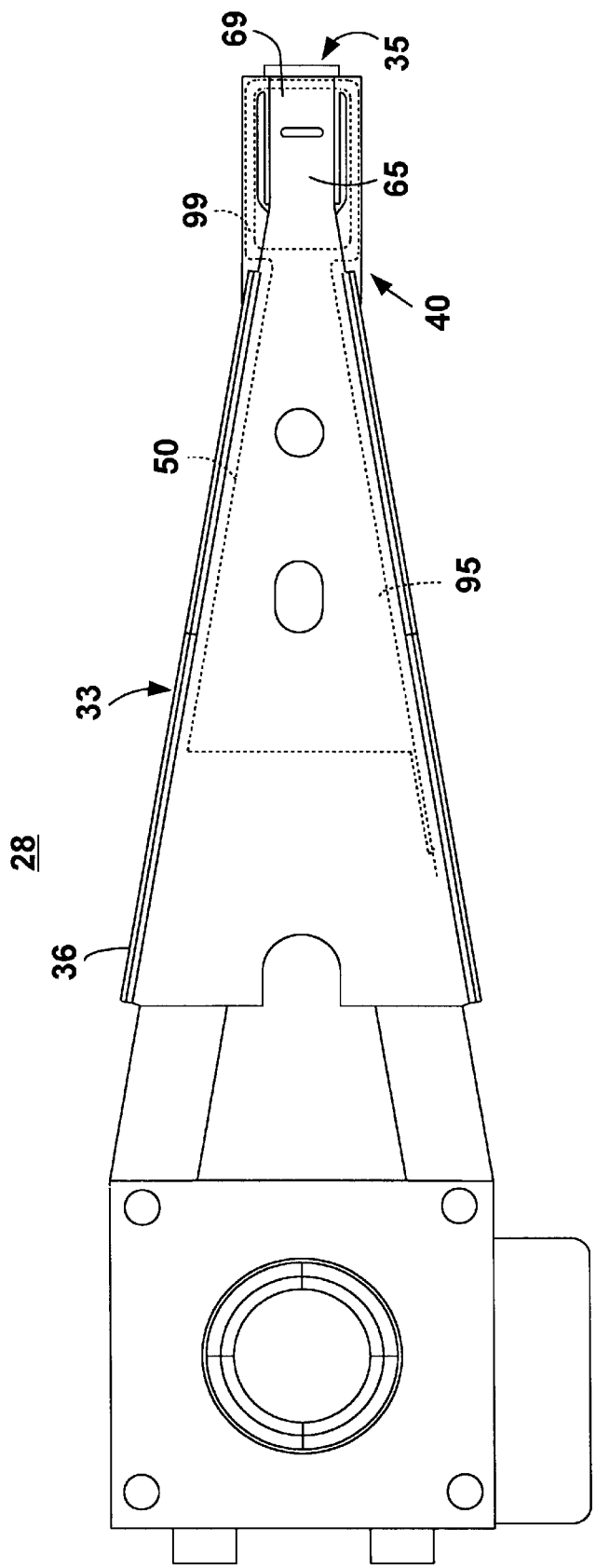
FIG. 2 is a top plan view of a head gimbal assembly (HGA) comprised of the load beam, a flexure, and a slider, and forming part of the data storage system of FIG. 1, for use in a head stack assembly.
Figure 3:
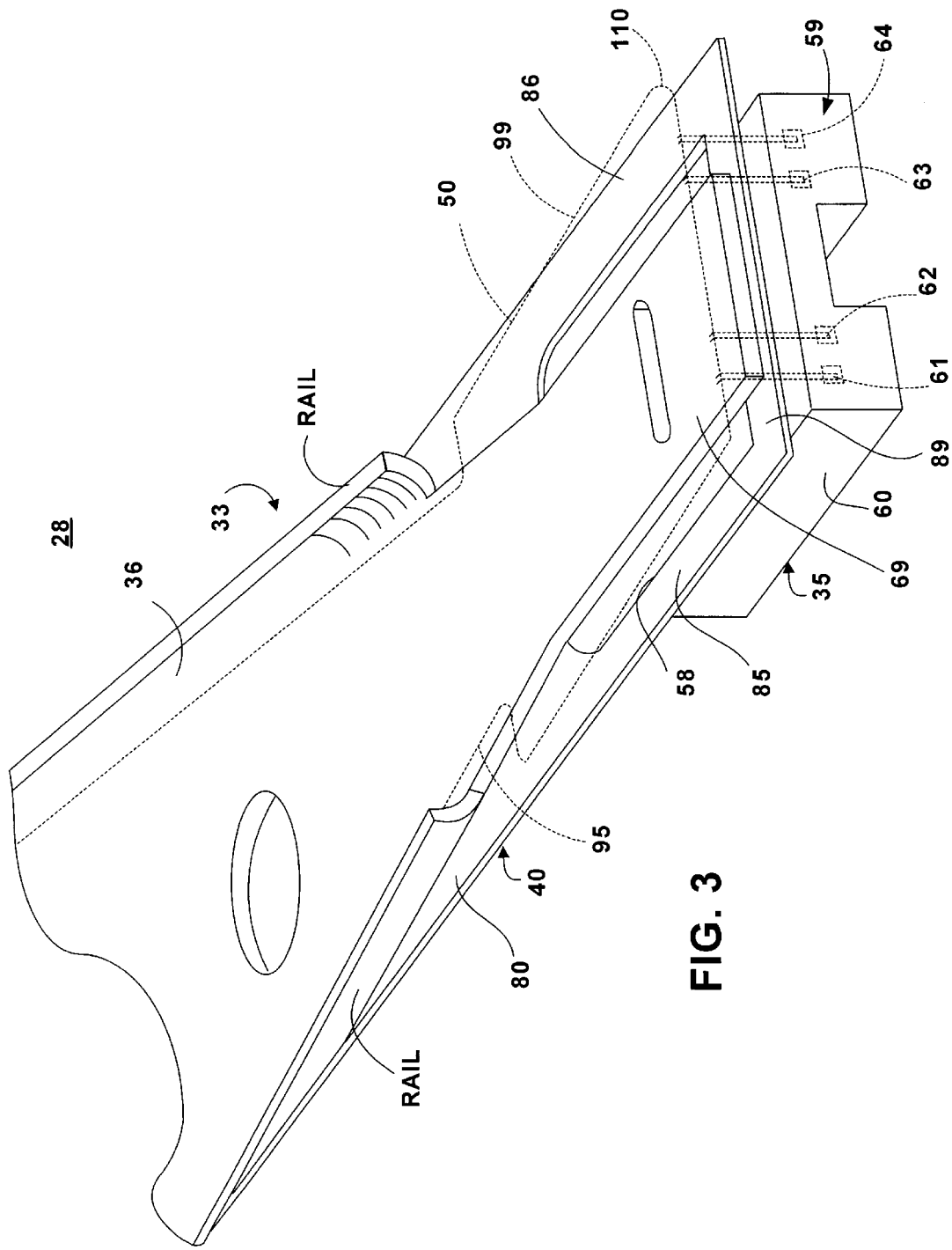
FIG. 3 is an enlarged isometric view of the HGA of FIG. 2, illustrating the disposition of a FOS forming part of the HGA, relative to load beam, the flexure, and the slider according to the present invention.

A head gimbal assembly (HGA) 28 is secured to each of the actuator arms, for instance 18A. With further reference to FIGS. 2 and 3, the HGA 28 is comprised of a suspension 33 and a read/write head 35. The suspension 33 includes a load 36 and a flexure 40 to which the head 35 is secured. The HGA 28 further includes a flex circuit or a flex circuit on suspension (FOS) 50 shown schematically in dashed lines in FIG. 2 and in solid lines in FIG. 3, and further illustrated in greater detail in FIG. 4.

Figure 5:
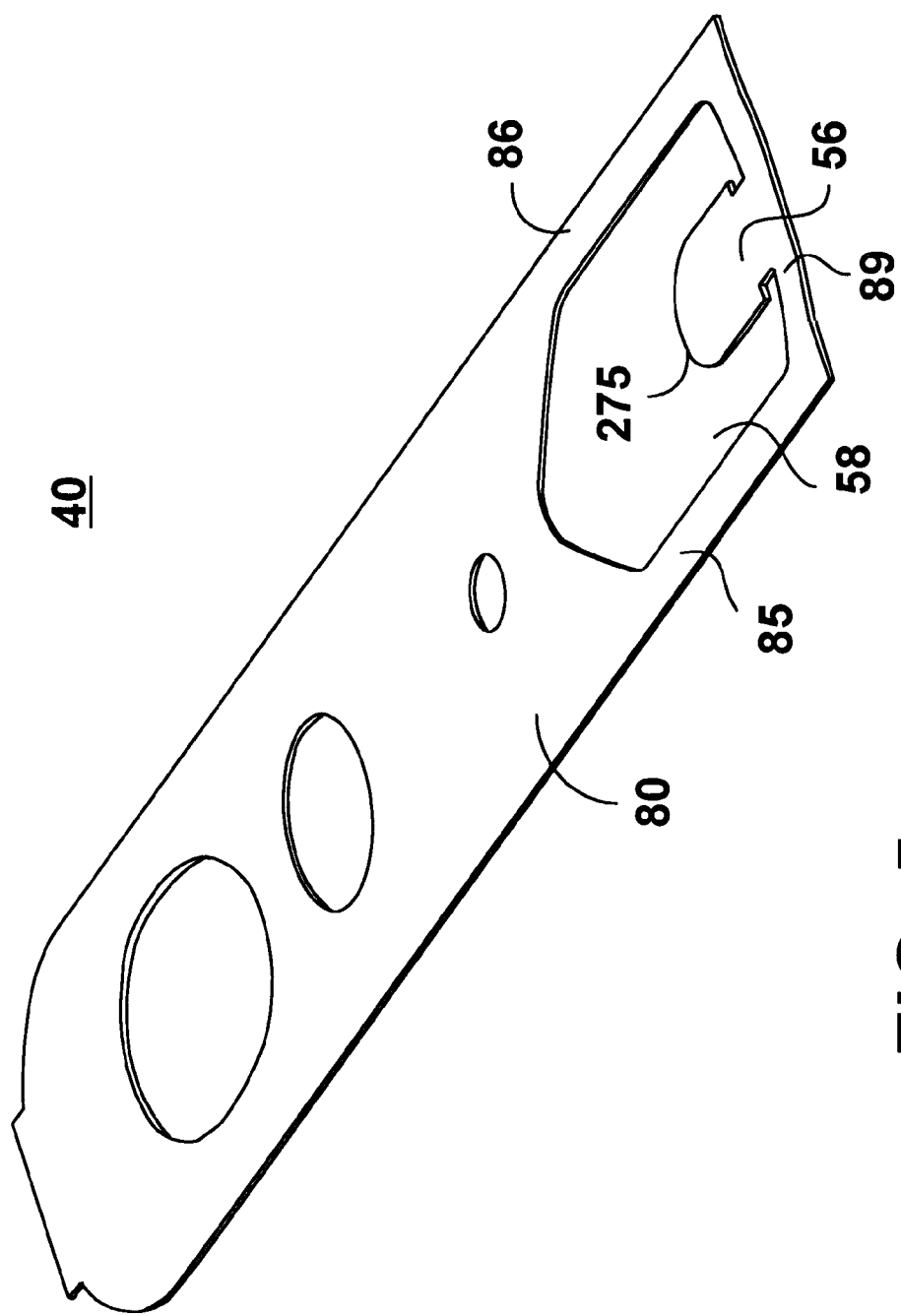
FIG. 5 is an enlarged, isometric view of the flexure of FIGS. 2 and 3.

With reference to FIGS. 3 and 5, the flexure 40 includes a resilient tongue 56 that extends inwardly, within a clearance 58. The clearance 58 is contoured by a flexure body 80, two oppositely disposed peripheral ribs 85, 86, and a trailing edge 89. The flexure 40 provides a slider 60 with sufficient flexibility in various degrees of movement for accommodating the uneven topology of the disk surface, while the slider 60 is flying over the disk 14. The flexure 40 is sufficiently stiff to resist physical deformation that may be caused by the rapid movement of the actuator arms 18A, 18B, 18C.

The slider 60 forms part of the read-write head 35, and is secured to the tongue 56 by means of available techniques such as UV curable epoxy. The trailing side 59 of the slider 60 includes a plurality of conductive contact pads, four of which 61, 62, 63, 64 are shown in FIG. 3 for the purpose of illustration only. These contact pads 61–64 are electrically connected to the FOS 50 by means of corresponding conductive traces 61T, 62T, 63T, and 64T.

Figure 7:
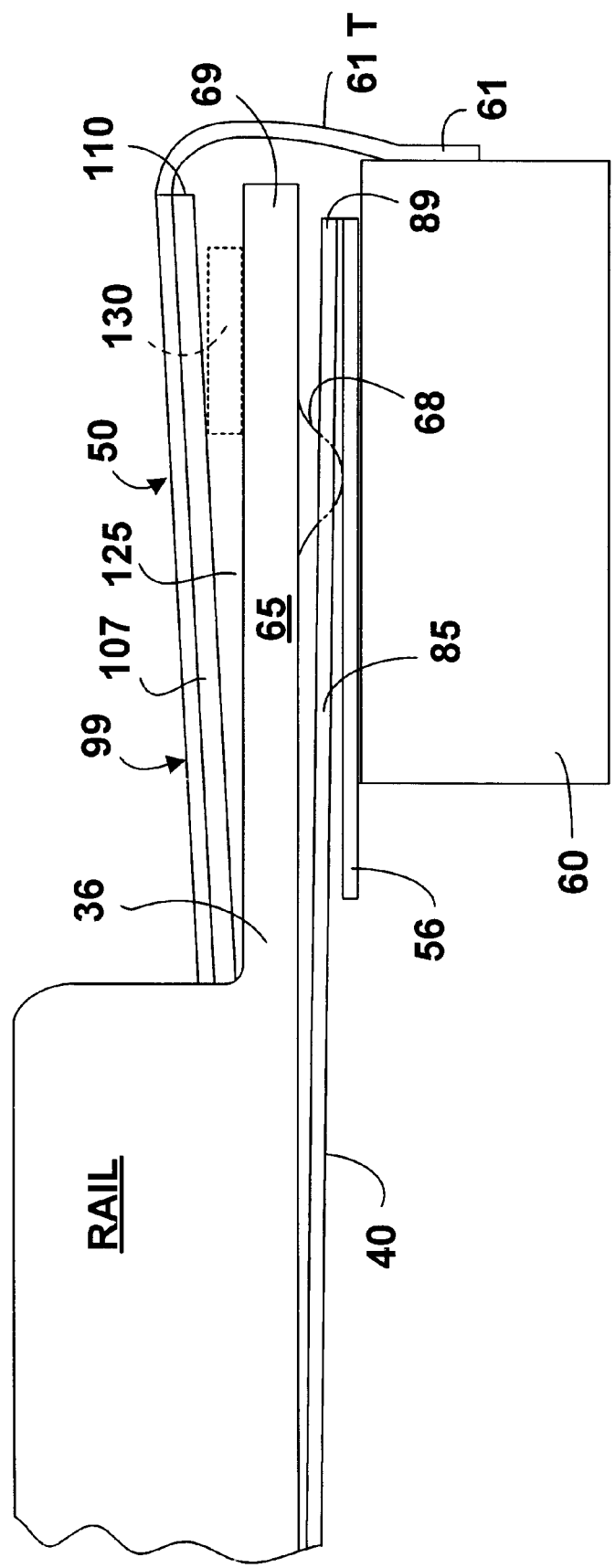
FIG. 7 is a fragmentary, enlarged side elevational view of the HGA of FIGS. 2 and 3, illustrating the slider and the flexure in a nominal position (i.e., no limiter contact) relative to the rear motion limiter of FIG. 6.

With further reference to FIG. 7, a dimple 68 is formed in the load beam 36, and is urged against the backside of the tongue 56 through the clearance 58, for contributing to the gimbaling action. Alternatively, the dimple 68 may be formed on the tongue 56, and urged against the underside of the load beam 36.

Figure 6:
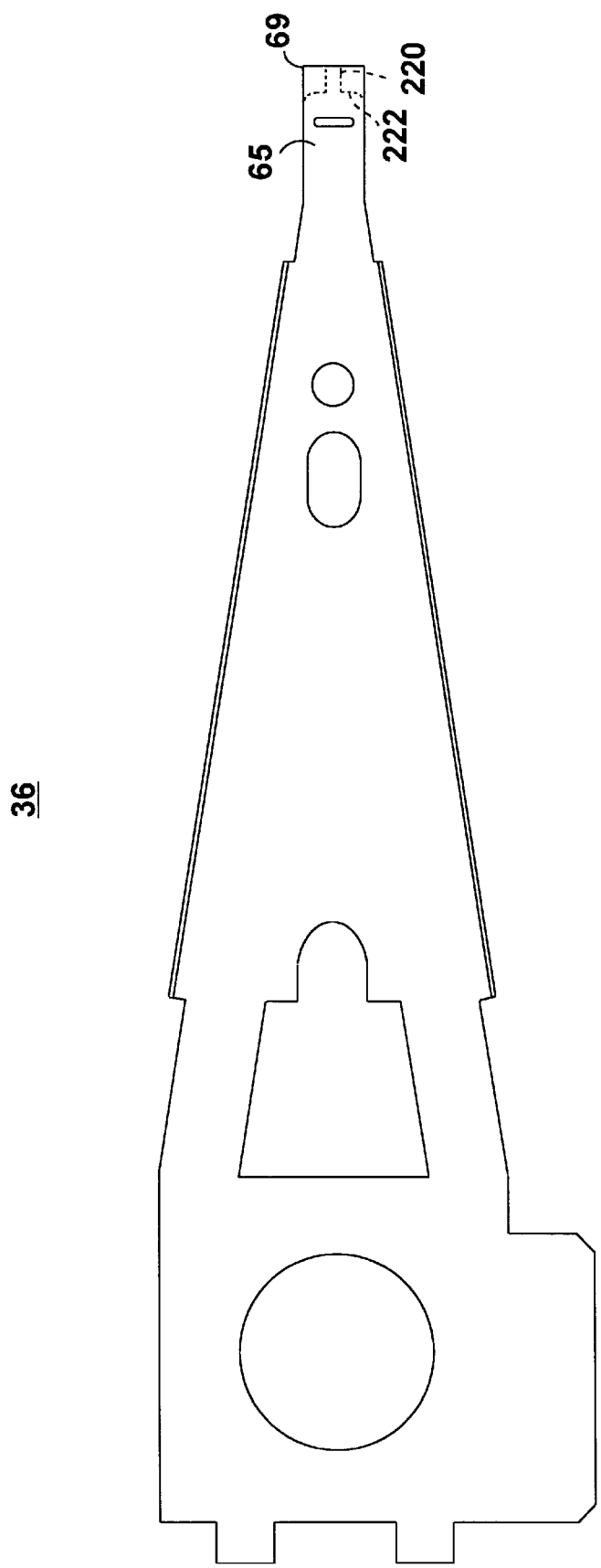
FIG. 6 is a top plan view of the load beam of FIGS. 2 and 3, illustrating the inclusion of a rear motion limiter.

With further reference to FIG. 6, the load beam 36 includes a flexure portion 65 which is positioned adjacent to peripheral ribs 85, 86 of the flexure 40. The flexure potion 65 defines and includes a rear motion limiter 69, which is an integral extension of the load beam 36. In this embodiment, the rear motion limiter 69 is a one-piece, generally flat tab, the function of which will become clearer when describing the details of the FOS 50.

Figure 4:
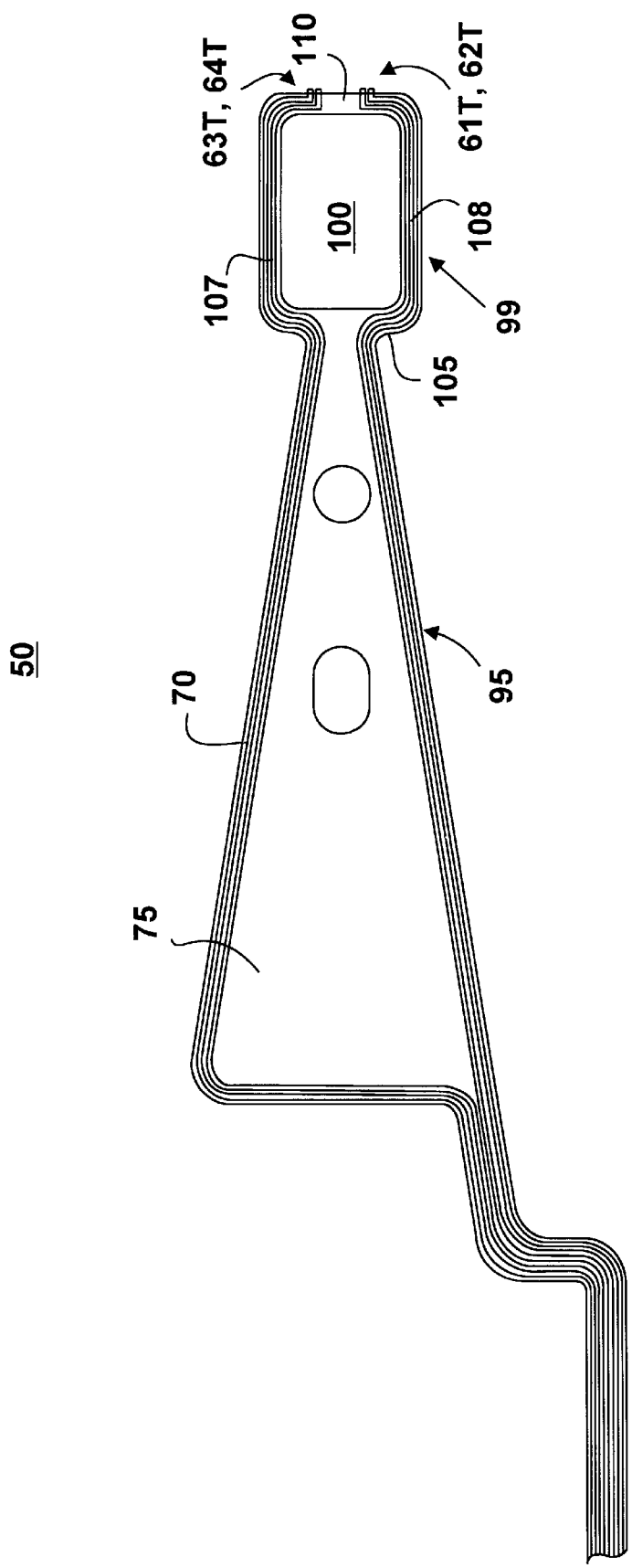
FIG. 4 is an enlarged top plan view of the FOS of FIGS. 2 and 3.

Referring to FIG. 4, the FOS 50 can be a conventional flexible circuit, or a laminate comprised of a pattern of conductive traces 70 that are formed on a compliant dielectric layer 75. The dielectric layer 75 is a flat, flexible sheet of material adhered on one side to the patterned conductive traces 70. The dielectric layer 75 is made of plastic or a polymeric resinous material, such as polyamide, and is attached by means of available techniques to the conductive traces 70. The conductive traces 70 can be made of conductive material, such as steel, beryllium, gold, silver, but preferably from copper, due to the desirable conductivity and tensile modulus of copper. The conductive traces 70 can optionally be coated with an protective layer (not shown) to prevent them from shorting.

As further illustrated in FIG. 2, the FOS 50 includes a load beam section 95 that extends generally along the load beam 36. The load beam section 95 extends integrally into a flexure section 99 that generally overlays the flexure 40 without touching it. The flexure section 99 is defined by a central aperture 100 which is outlined by a leading segment 105 that integrates with the load beam section 95 and that projects in two oppositely disposed peripheral segments 107, 108. The peripheral segments 107, 108 unite to form a trailing segment 110.

The load beam section 95 is secured to the load beam 36 at desired locations for allowing minimal gimbal stiffness. The peripheral segments 107, 108 of the FOS flexure section 99 overlay the peripheral ribs 85, 86 of the flexure 40, respectively, but do not contact them. Similarly, the FOS trailing segment 110 overlays the trailing edge 89 of the flexure 40, but are not in contact therewith. While a specific embodiment of the FOS 50 is described herein, it should be appreciated that other FOS designs can be used within the scope of the present invention.

As is more clearly illustrated in FIGS. 7 and 8, and as it will be described later in greater detail, the FOS flexure section 99 is separated from the rear motion limiter 69 by a preformed gap 125. The gap 125 is formed during assembly by, for example, inserting a separation device, for example a shim or spacer 130, between the FOS flexure section 99 and the rear motion limiter 69. The shim 130 defines the dimensions of the gap 125, and is removed upon completion of the assembly process.

Figure 8:
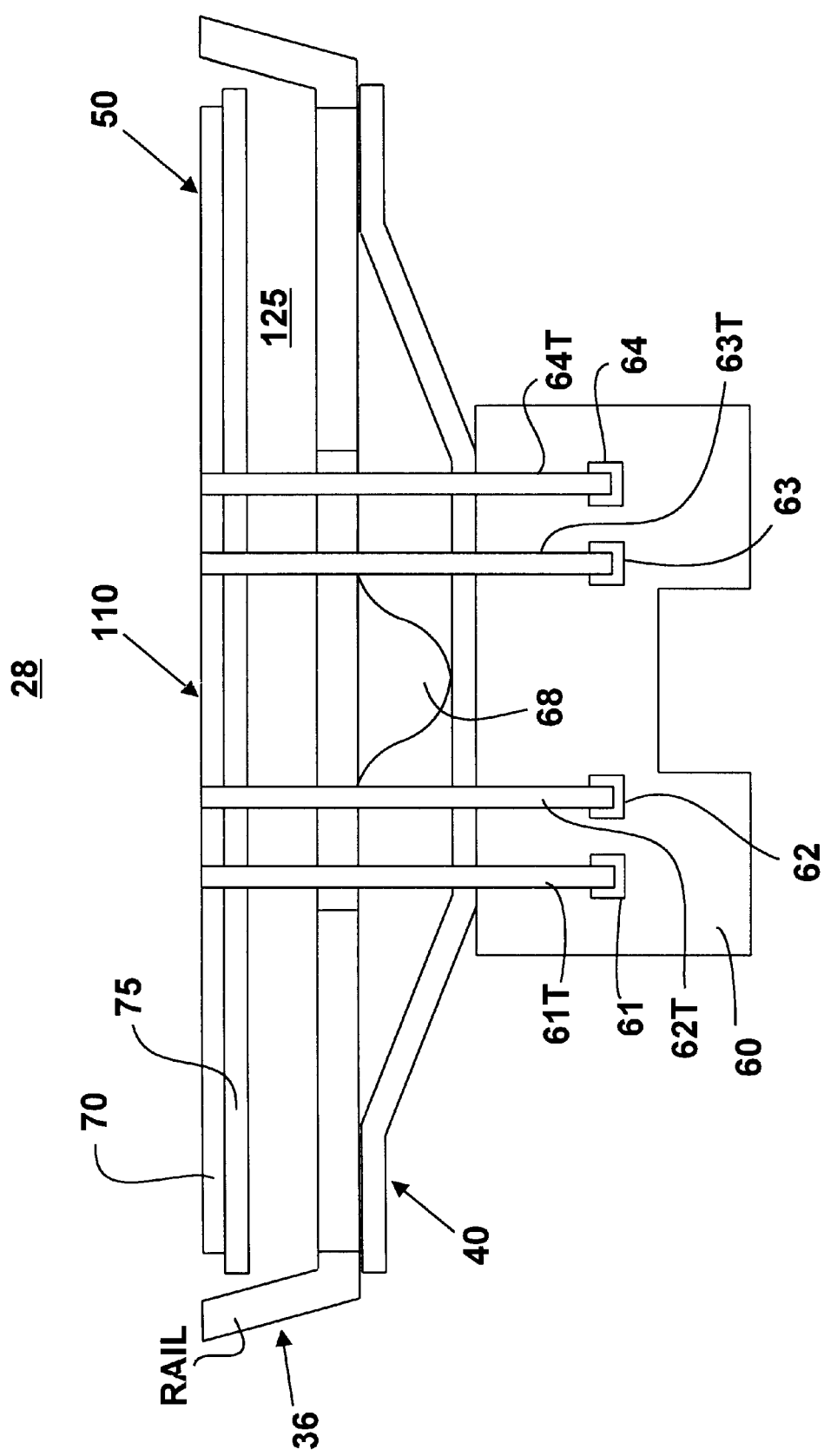
FIG. 8 is a front elevational view of the HGA of FIG. 7.
Figure 9:
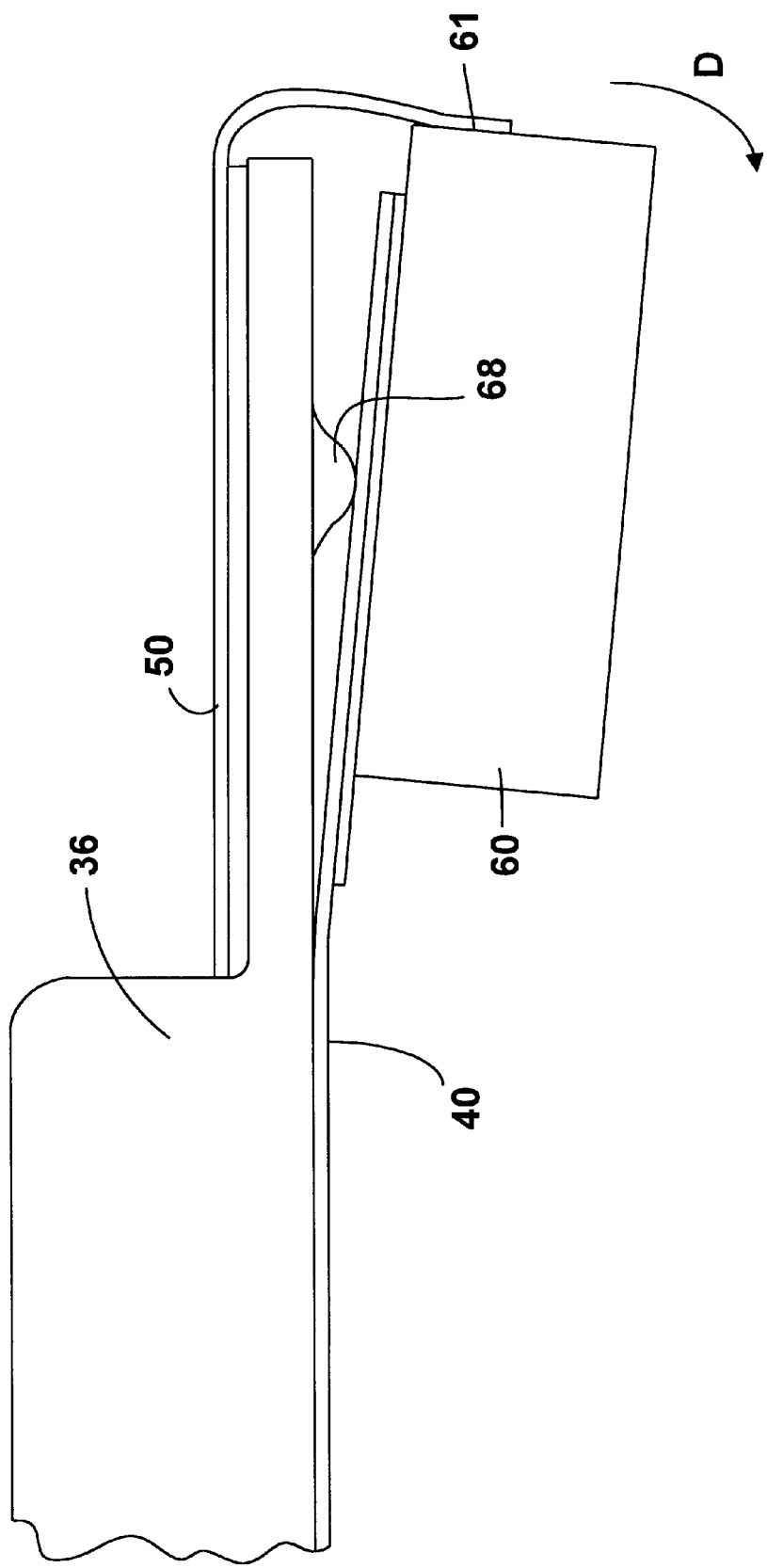
FIG. 9 is a fragmentary, enlarged side elevational view of the HGA of FIG. 7, illustrating the slider and the flexure in an extreme position with the rear motion limiter in contact with the FOS, resulting from the application of a shock load to the HGA.

With reference to FIGS. 7 and 8, the FOS trailing segment 110 is shown in a nominal position as overlaying the rear motion limiter 69. When the head 35 is exposed to a shock load, imparting a moment illustrated by the arrow D in FIG. 9, the slider 60 and the flexure 40 assume a positive pitch position relative to the rear motion limiter 69. As a result of the bending of the flexure 40, the rotation of the slider 60 causes the FOS 50 to be pulled toward the load beam 36 and the rear motion limiter 69, until the gap 125 collapses, and the FOS trailing segment 110 abuts against the rear motion limiter 69 and its further movement stopped.

Figure 10:
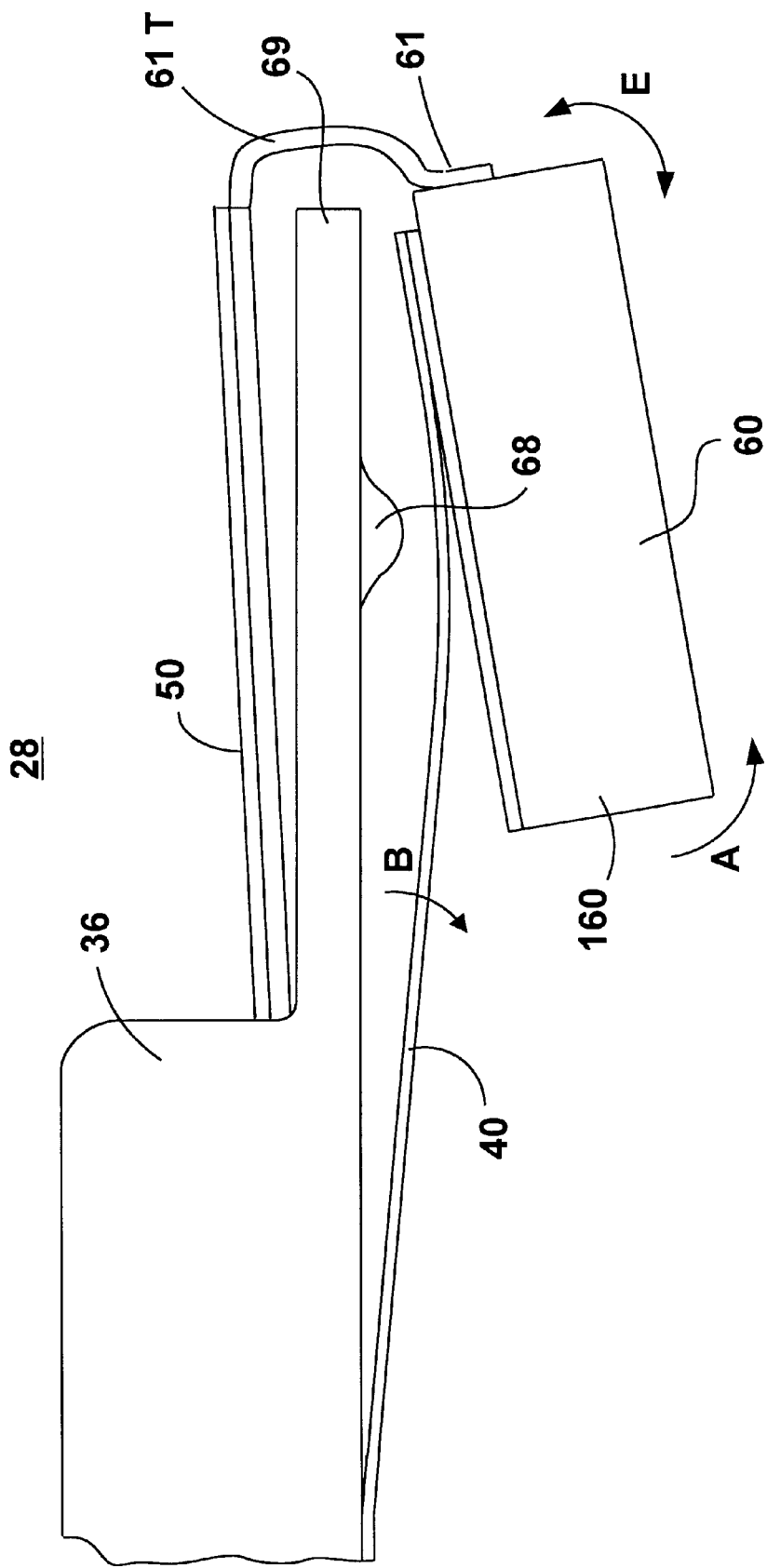
FIG. 10 is a fragmentary, enlarged side elevational view of the HGA of FIG. 7, illustrating the slider and the flexure in a negative pitch position, resulting from the application of a shock load to the HGA.

FIG. 10 illustrates the slider 60 and the flexure 40 in a negative pitch position relative to the rear motion limiter 69, resulting from the application of a shock load (illustrated by the arrow E). In this condition, the leading edge 160 of the slider 60 pivots away from the load beam 36, in the direction of the arrow A, and causes the flexure 40 to pivot along the arrow B. While in this condition the rear motion limiter 69 affords some motion limiting effect, it might not be totally sufficient to prevent permanent damage to the flexure 40 in the event of an extremely high shock load. Wherefore, it might be desirable to use a front motion limiter 200, 200A, as it will be described later in relation to FIGS. 15–20 to complement the limiting action of the rear limiter 69.

Figure 11:
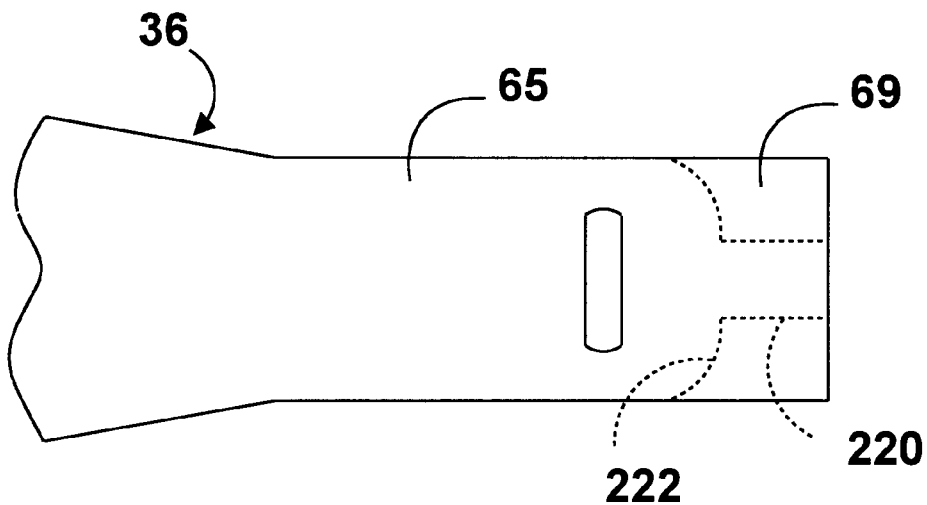
FIG. 11 is a fragmentary, enlarged top plan view of the load beam of FIG. 6, illustrating two rear motion limiter embodiments.

FIGS. 6 and 11 through 14 illustrate various embodiments of the rear motion limiter according to the present invention. FIGS. 6 and 11 show the rear motion limiter 69 described above in connection with FIGS. 2, 3, and 7, and further illustrate another rear motion limiter 220 shown in dashed lines. The rear motion limiter 220 is basically similar in function to the rear motion limiter 69, but includes a narrower tab that extends from the wider trailing edge 222 of the load beam 36. The rear motion limiter 220 illustrates the possibility of varying the width of the rear motion limiter 69, 220 as required by the head design, to restrict the roll movement of the slider 60 relative to the load beam 36. For illustration purpose only, the width of the rear motion limiter 69, 220 can vary, for example, between 0.005 mil and 0.100 mil where one mil equals one one thousandth of an inch.

Figure 12:
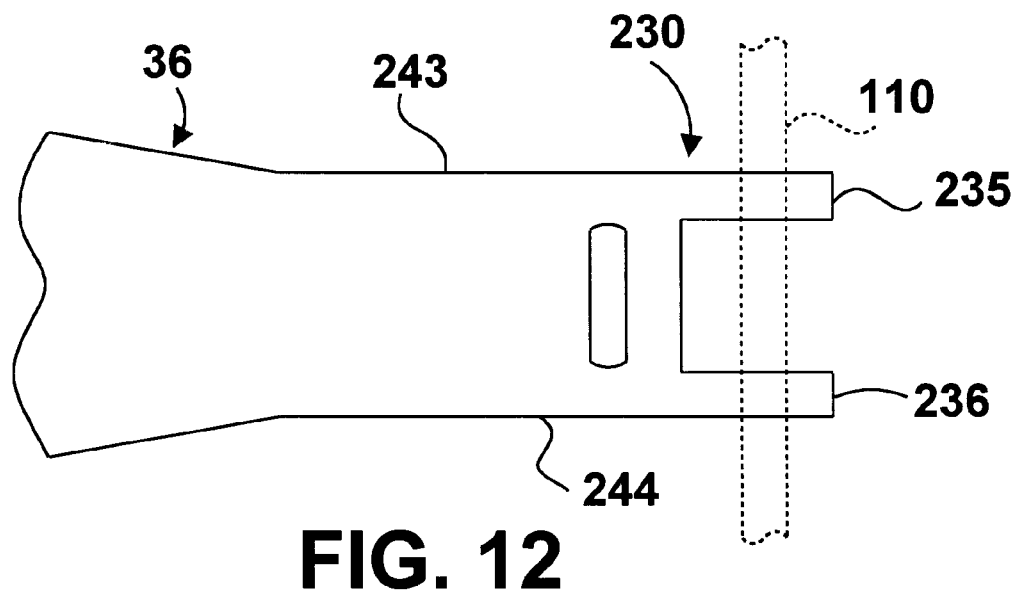
FIG. 12 is a fragmentary, enlarged top plan view of the load beam of FIG. 6, illustrating another rear motion limiter embodiment.

FIG. 12 illustrates another rear motion limiter 230 according to the present invention. The rear motion limiter 230 has basically a similar function to that of the rear motion limiters 69 and 220, but includes two tabs 235, 236 that extend from and form an integral part of the load beam 36. The FOS trailing segment 110 is shown in dashed lines, overlaid on top of the tabs 235, 236. The downward movement (e.g. toward the disk 14) of the FOS trailing segment 110 is limited by the tabs 235, 236. While the rear motion limiter 230 is shown as comprising two tabs 235, 236, it should be clear that the rear motion limiter 230 can optionally comprise or more tabs.

While the tabs 235, 236 are shown as extending from the peripheral sides 243, 244, respectively, of the load beam 36, it should be understood that the tabs 235, 236 can be formed at appropriate locations along the width of the load beam 36. In a preferred embodiment the tabs 235, 236 are symmetrically disposed relative to a central axis of the load beam 36; however, other non-symmetrical positions can alternatively be selected. In addition, while the tabs 235, 236 have similar widths, ranging, for the purpose of illustration only, between 0.003 mil and 0.02 mil, it should be clear that the tabs 235, 236 can optionally have different widths, depending on the head performance and design. Furthermore, while the tabs 235, 236 are illustrated as extending at a 90 degree angle relative to the load beam 36, it should be clear that a different angle (or angles) can be selected for each tab 235, 236. Moreover, while the tabs 235, 236 are shown as being rectangularly shaped, it should be clear that other shapes can alternatively be selected.

Figure 13:
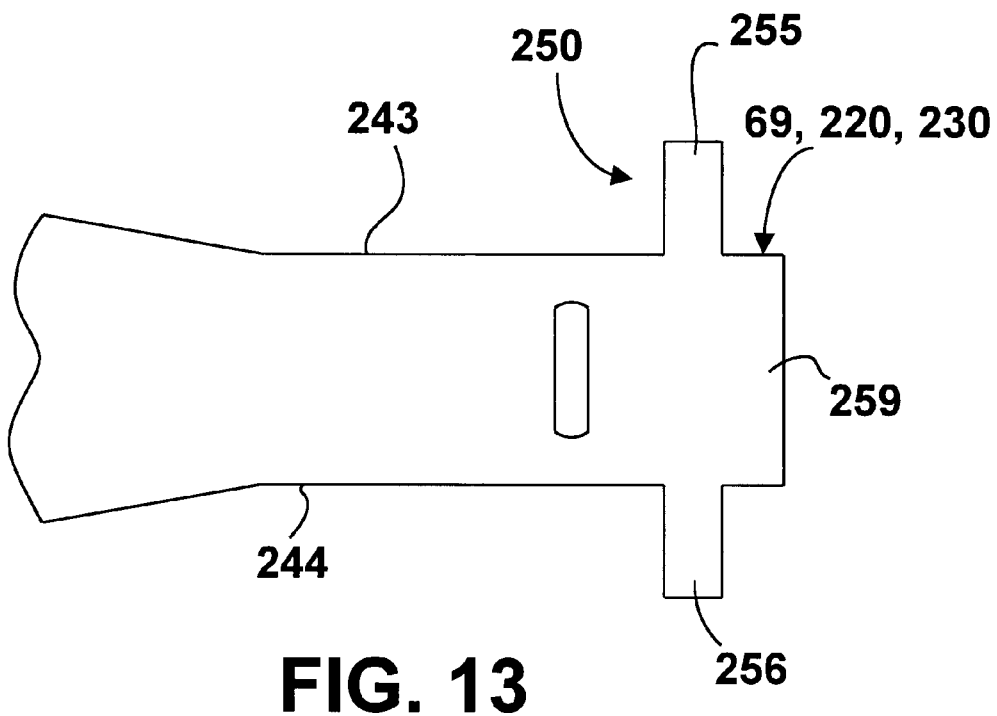
FIG. 13 is a fragmentary, enlarged top plan view of the load beam of FIG. 6, illustrating yet another rear motion limiter embodiment.

FIG. 13 illustrates yet another rear motion limiter 250 that is generally similar in function to the rear motion limiters described herein. The rear motion limiter 250 includes the rearward extension or tab 259 that defines the rear motion limiter 69, and further includes two lateral wings 255, 256 that extend at an angle relative to the peripheral sides 243, 244 of the load beam 35, respectively. The lateral wings 255, 256 can extend from any desirable position along the length of the rearward tab 259.

While in a preferred embodiment the lateral wings 255, 256 are shown as being symmetrically disposed, other non-symmetrical positions can alternatively be selected. In addition, while the rear motion limiter 250 is shown as comprising two lateral wings 255, 256, it should be clear that a different number of lateral wings can be selected. Also, while the lateral wings 255, 256 have similar widths, ranging, for the purpose of illustration only, between 0.005 and 0.25 mil, it should be clear the the lateral wings 255, 256 can optionally have different widths, depending on the head performance and design. Furthermore, while the lateral wings 255, 256 are illustrated as extending at a 90 degree angle relative to the load beam 36, it should be clear that a different angle (or angles) can be selected for each lateral wing 255, 256. Moreover, while the lateral wings 255, 256 are shown as being rectangularly shaped, it should be clear that other shapes can alternatively be selected. It should be noted that the rearward tab 259 can assume the design of any of the rear motion limiters 69, 220, or 230 described above.

Figure 14:
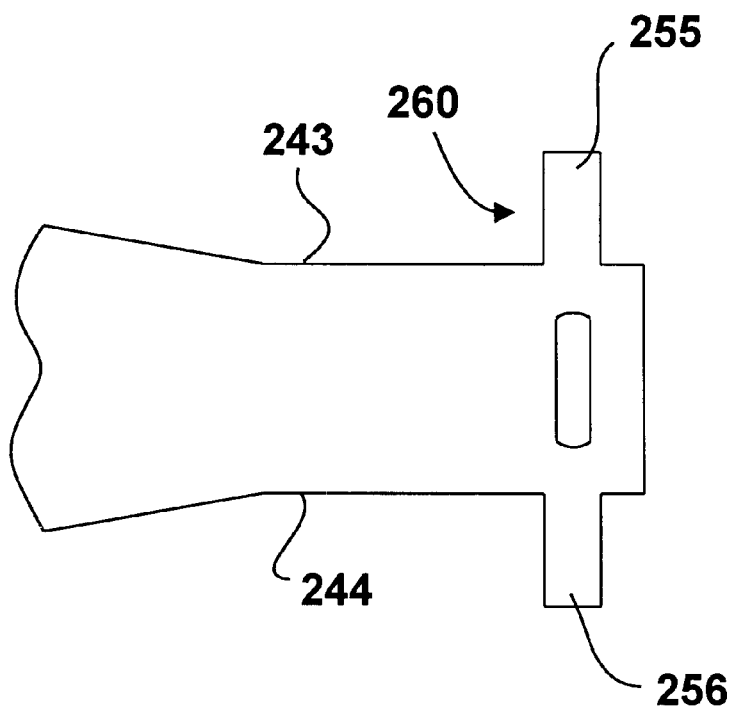
FIG. 14 is a fragmentary, enlarged top plan view of the load beam of FIG. 6, illustrating still another rear motion limiter embodiment.

FIG. 14 illustrates another rear motion limiter 260 formed by the lateral wings 255, 256, without the rearward tab 259.

Figure 15:
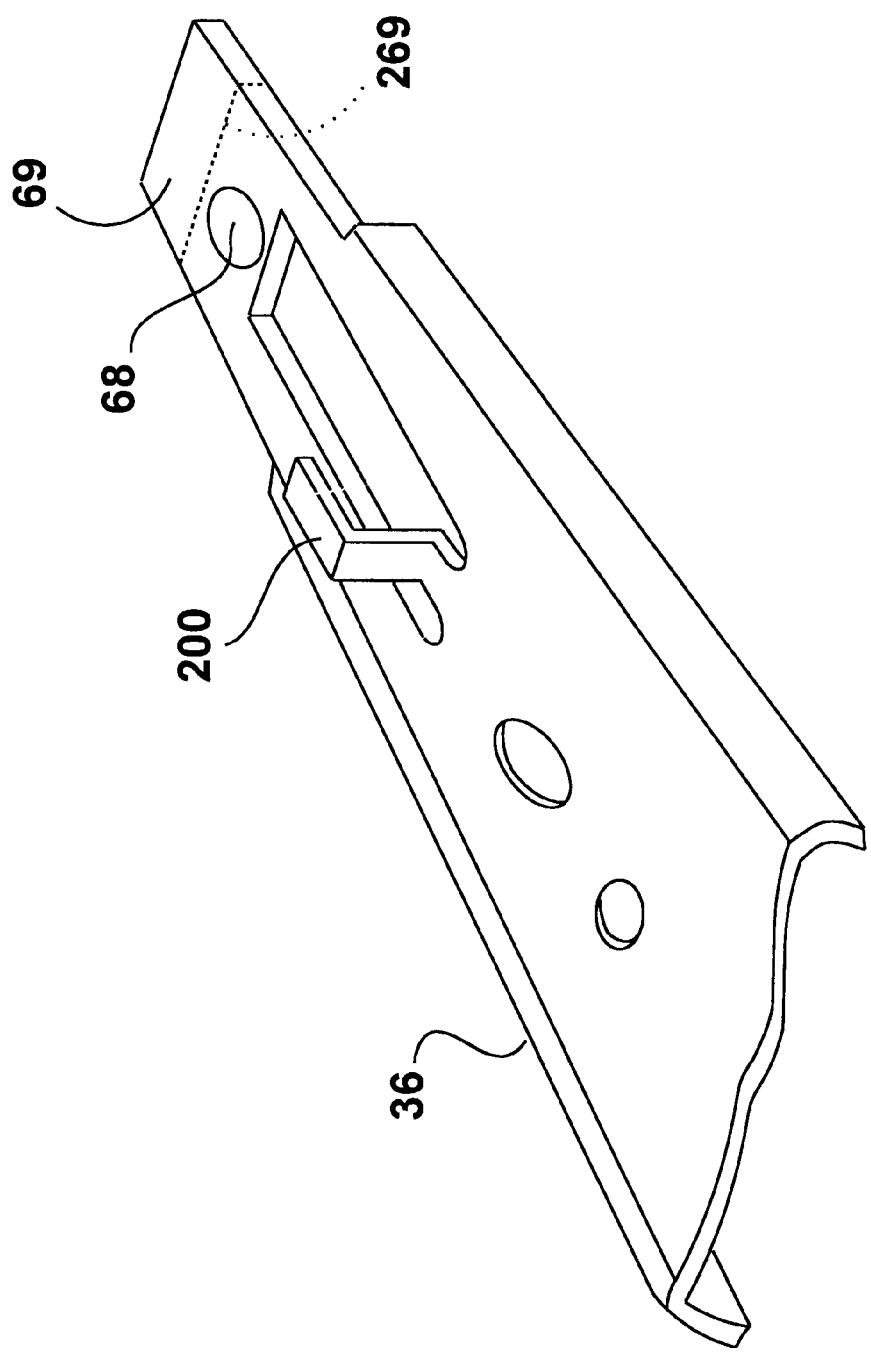
FIG. 15 is a fragmentary, isometric bottom view of a load beam design incorporating front and rear motion limiters according to a first embodiment of the present invention.
Figure 17:
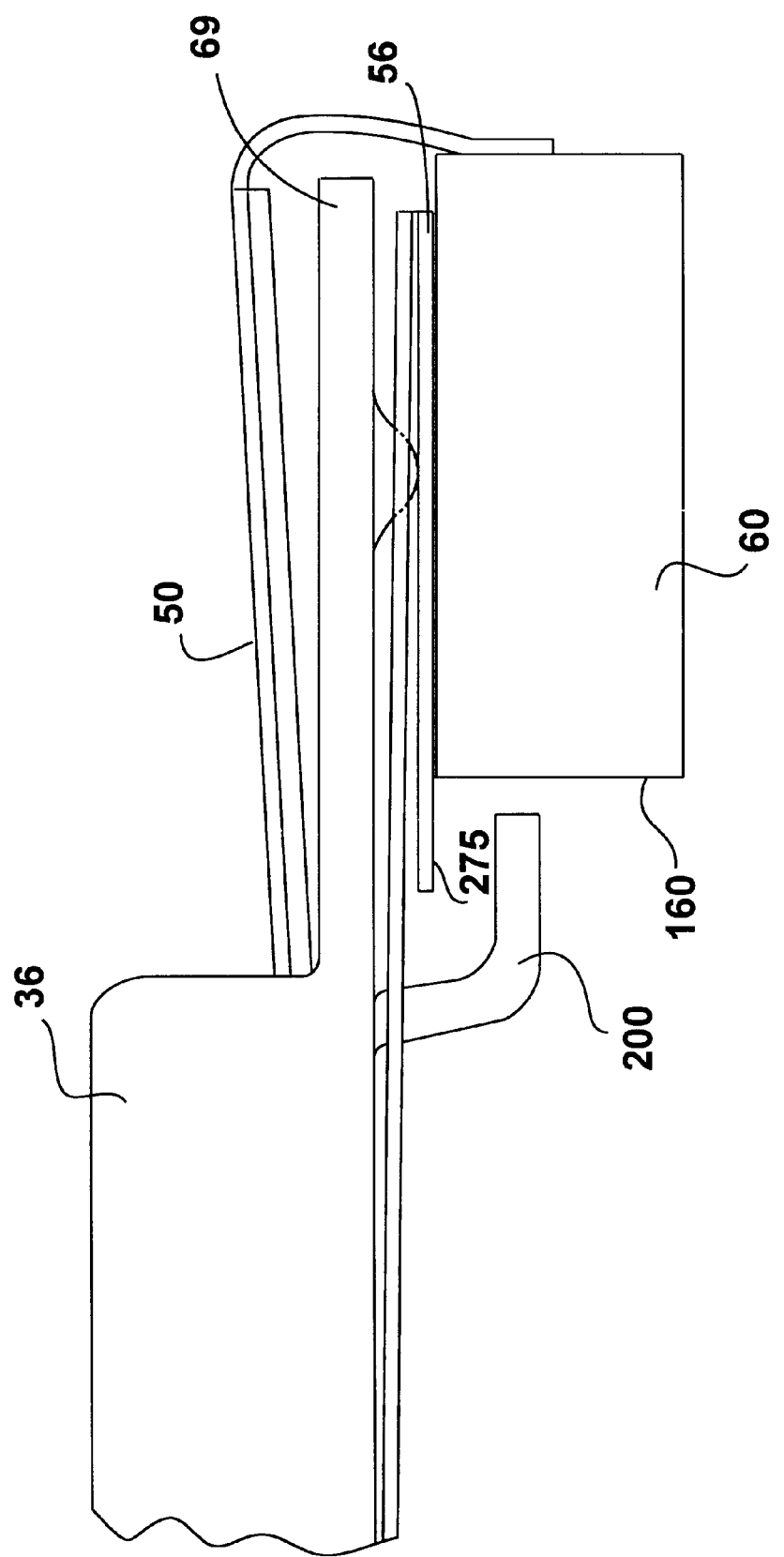
FIG. 17 is a fragmentary, enlarged side elevational view of the HGA of FIGS. 2 and 3, incorporating the front motion limiter of FIG. 15, shown in a nominal position (i.e., no limiter contact)

FIGS. 15 and 17 illustrate a front motion limiter 200 comprised of an L-shaped tab which is bent downwardly (i.e., toward the disk 14), and which is formed integrally with the load beam 36. The front motion limiter 200 is disposed close to the slider leading edge 160, opposite the rear motion limiter 69 (defined for the purpose of illustration only by a demarcation line 269). The front motion limiter 200 is positioned underneath a free end 275 of the tongue 56 (refer also to FIG. 5).

Figure 19:
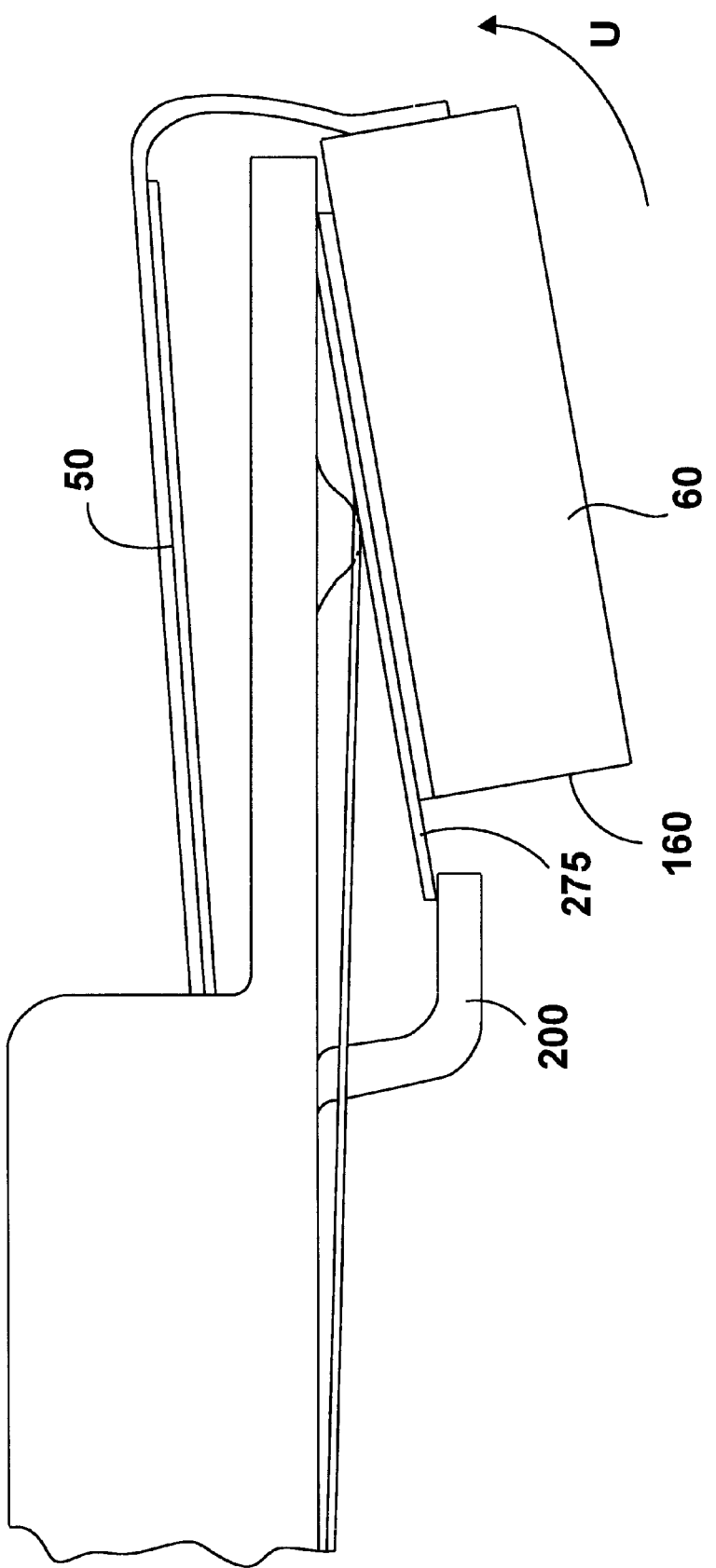
FIG. 19 is a fragmentary, enlarged side elevational view of the HGA of FIG. 17, illustrating the slider and the flexure in a negative pitch position, resulting from the application of a sudden upward shock load to the HGA, causing front limiter contact.
Figure 20:
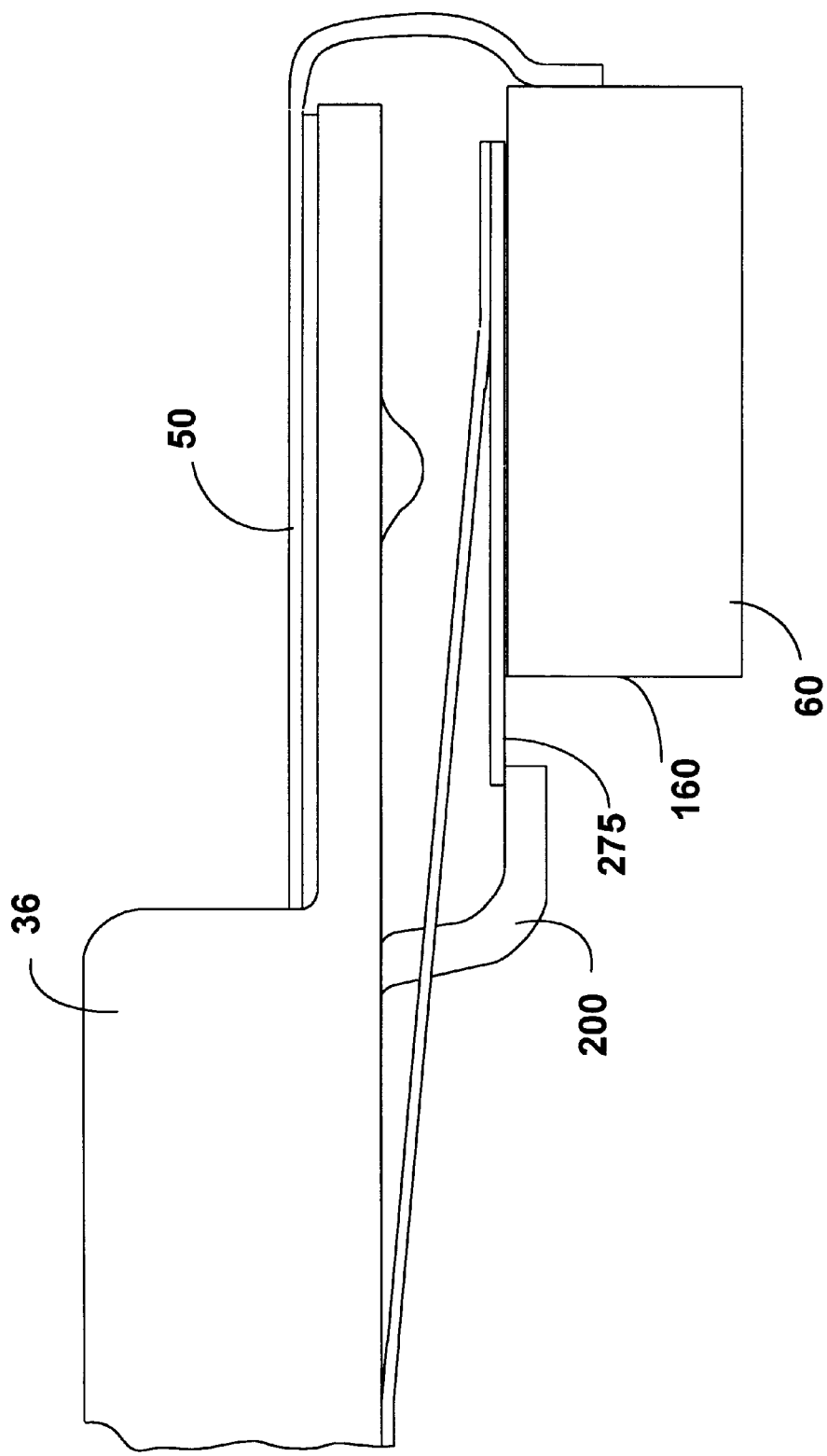
FIG. 20 is a fragmentary, enlarged side elevational view of the HGA of FIG. 7, illustrating the slider and the flexure showing both front and rear limiters contacts.

With further reference to FIG. 19, when the slider 60 and the flexure 40 are in a negative pitch position, resulting from the application of a sudden shock load to the HGA 28 (as illustrated by the arrow U), the tongue free end 275 engages the front motion limiter 200, and its downward travel limited thereby.

As explained above in connection with FIG. 10, when the slider 60 is in negative pitch position relative to the rear motion limiter 69, resulting from the application of a shock load (illustrated by the arrow E), the leading edge 160 of the slider 60 pivots away from the load beam 36, in the direction of the arrow A, and causes the flexure 40 to bow. While in this condition the rear motion limiter 69 does not prevent permanent damage to the flexure 40 in the event of an extremely high shock load, but the front motion limiter 200 prevents, if not substantially eliminates such permanent damage to the flexure 40. As the tongue free end 275 of FIG. 19 is pivoted in the direction of the arrow A, it eventually engages the front motion limiter 200, and its downward travel limited thereby.

Figure 18:
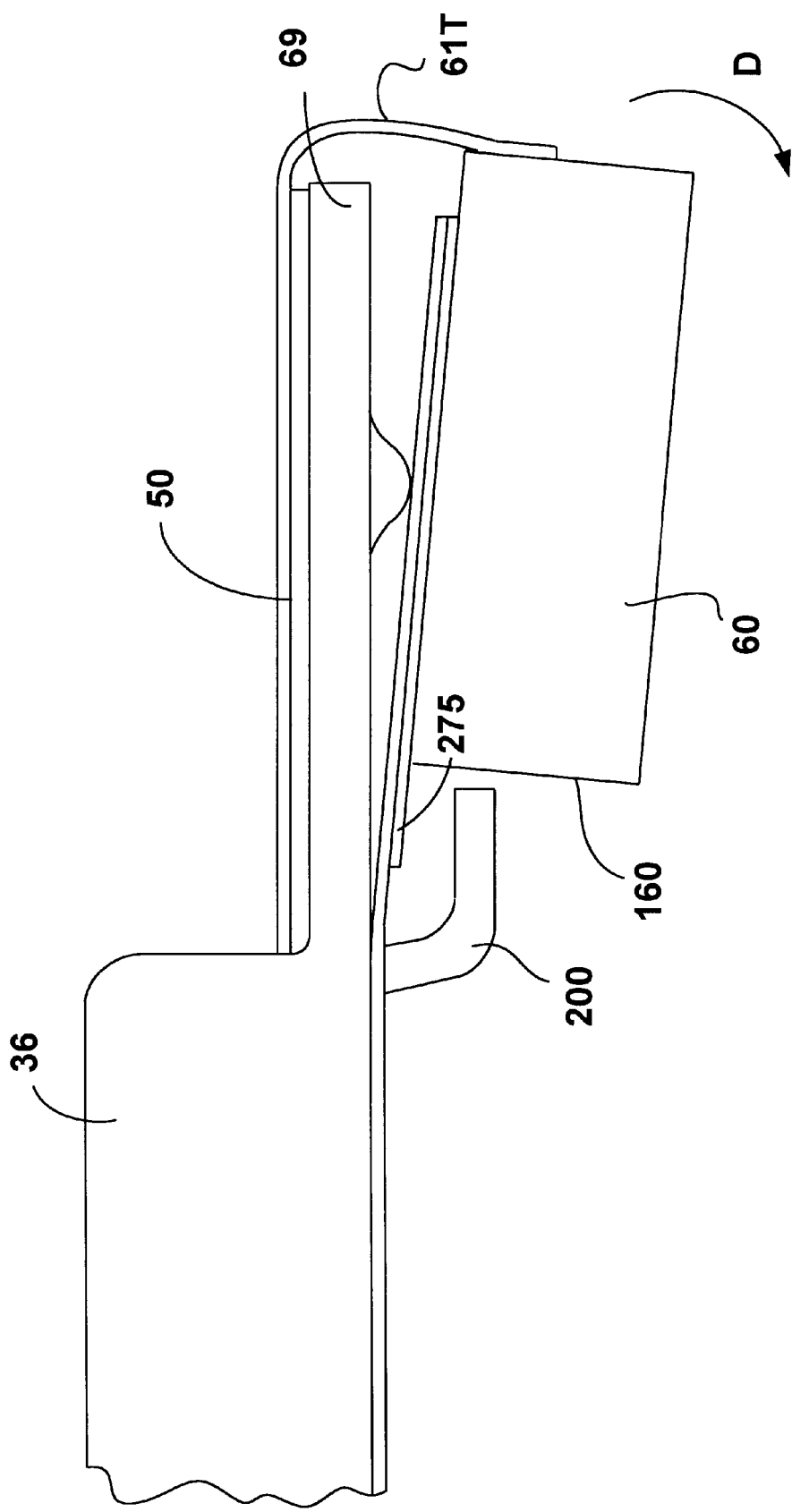
FIG. 18 is a fragmentary, enlarged side elevational view of the HGA of FIG. 17, illustrating the slider and the flexure in a positive pitch position, resulting from the application of a shock load to the HGA, causing rear limiter contact.

As explained above in connection with FIG. 9, the head 35 illustrated in FIG. 18 is exposed to a shock load, as illustrated by the arrow D, and the slider 60 and the flexure 40 assume a positive pitch position. As a result of the bending of the flexure 40, the rotation of the slider 60 causes the FOS 50 to be pulled toward the load beam 36, until the gap 125 collapses, and the FOS trailing segment 110 abuts against the rear motion limiter 69 and its further downward movement stopped. In this condition, the front motion limiter 18 does not play a significant role, but its inclusion can nonetheless be important to complement the role of the rear motion limiter 69 under the conditions illustrated in FIGS. 19 and 20, where the shock loads impart a negative pitch moment or translational force, respectively, or a combination of a pitch movement and a translational force.

Figure 16:
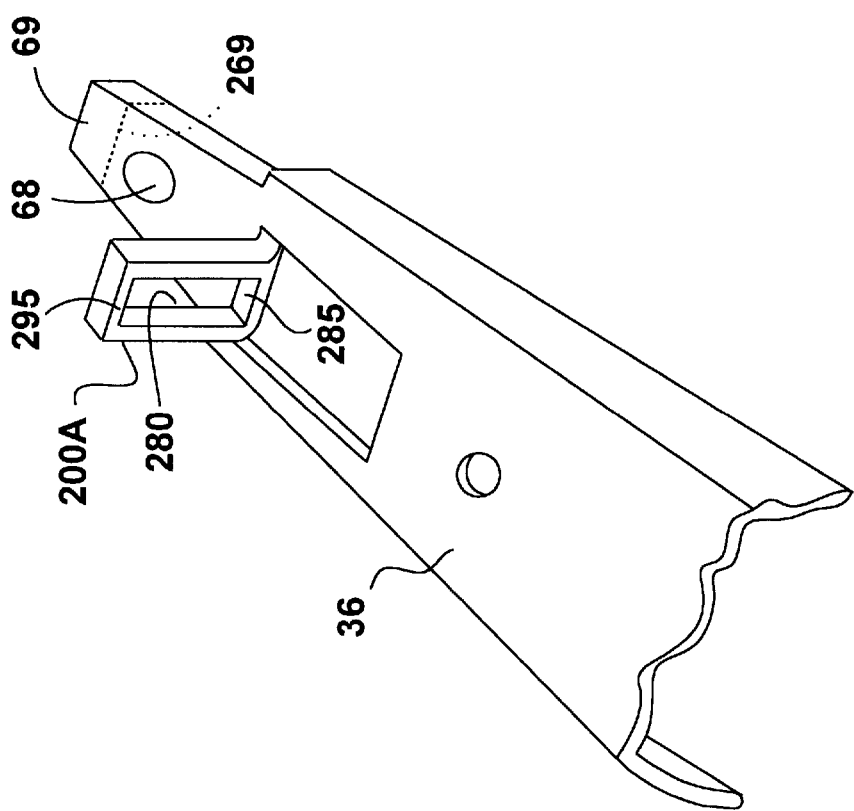
FIG. 16 is a fragmentary, isometric bottom view of a load beam design incorporating front and rear motion limiters according to a second embodiment of the present invention.
Figure 21:
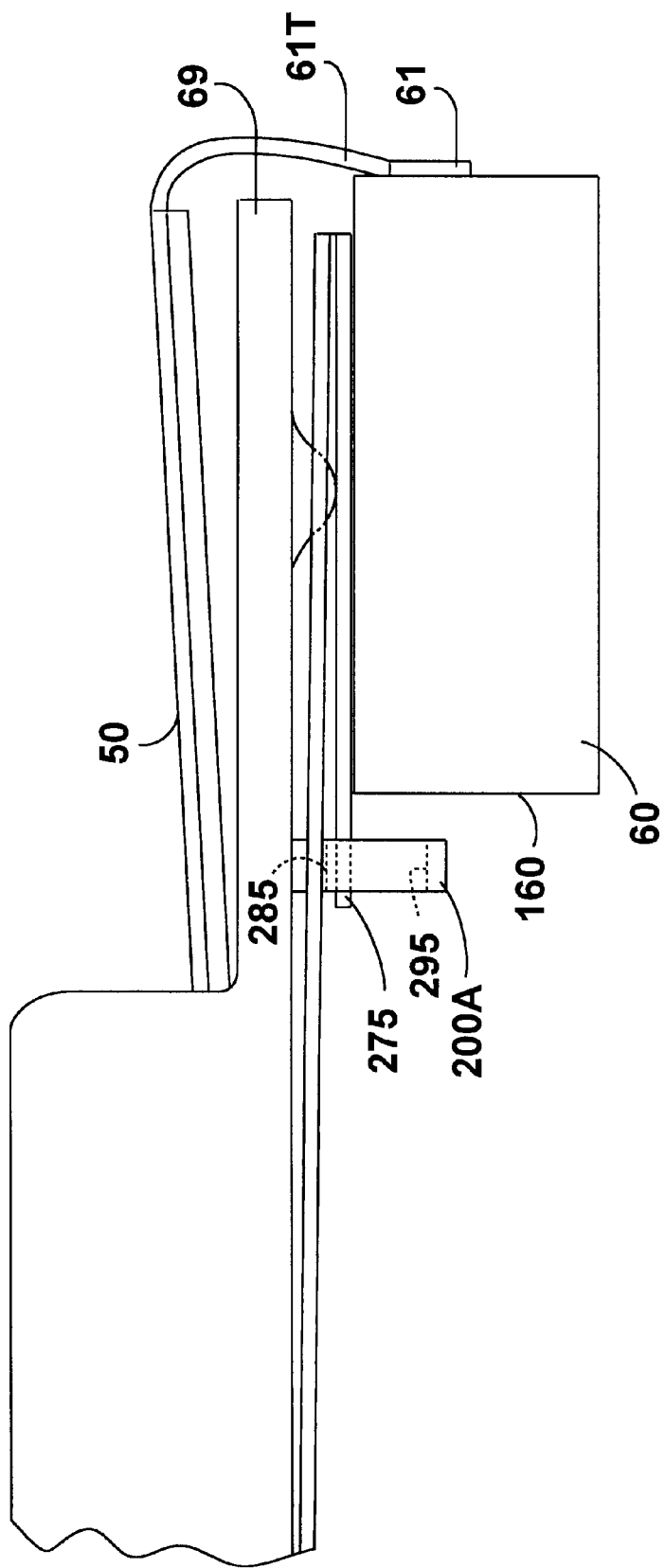
FIG. 21 is a fragmentary, enlarged side elevational view of the HGA of FIGS. 2 and 3, incorporating the front motion limiter of FIG. 16, shown in a nominal position.

FIGS. 16 and 21 illustrate another front motion limiter 200A which is generally similar in function to the front motion limiter 200. The front motion limiter 200A is annularly shaped, and defines a central passageway 280 which is outlined by an upper stop 285 and a bottom stop 295. The front motion limiter 200A extends integrally from the load beam 36. The tongue free end 275 passes through the central passageway 280, such that the movement of the tongue free end 275 is limited by the upper s 285 and the bottom stop 295.

While only two front motion limiters 200 and 200A are described herein, it should be understood that other front motion limiters can alternatively be used in conjunction with the rear motion limiters of the present invention. For example, some of the front motion limiters described in U.S. Pat. No. 5,771,136 to Girard can optionally be used.

It should be understood that the geometry, compositions, and dimensions of the elements described herein may be modified within the scope of the invention and are not intended to be the exclusive; rather, they can be modified within the scope of the invention. Other modifications may be made when implementing the invention for a particular environment.

What is claimed is:

1. A suspension of the type supporting a slider and a flex circuit, comprising:
    a load beam for supporting the flex circuit;
    a resilient flexure secured to said load beam and supporting the slider;
    the flex circuit including a flexure section; and
    said load beam defining a rear motion limiter, wherein said rear motion limiter is separated from the flexure section of the flex circuit when the flexure is in a nominal position, and engages the flex circuit and limits the slider movement when the flexure is in a positive pitch position.

2. A suspension according to claim 1, wherein said rear motion limiter extends intermediate the flex circuit and said flexure.

3. A suspension according to claim 2, wherein said flex circuit includes a pattern of conductive traces that are formed on a compliant dielectric layer.

4. A suspension according to claim 3, wherein said dielectric layer is a flat, flexible sheet of material adhered on one side to said pattern of conductive traces.

5. A suspension according to claim 2, wherein said flex circuit includes a load beam section secured to said load beam; and
    said flexure section that is separated from said rear motion limiter by a gap.

6. A suspension according to claim 5, wherein said flex circuit includes a trailing segment that engages said rear motion limiter when the slider journals beyond a predetermined distance from said load beam.

7. A suspension according to claim 1, wherein the rear motion limiter includes a generally flat tab that extends underneath the flexure section of the flex circuit.

8. A suspension according to claim 7, wherein the load beam includes a trailing edge which is wider than the tab; and
    wherein the tab that extends from the trailing edge of the load beam.

9. A suspension according to claim 1, wherein the rear motion limiter includes at least two tabs that extend from the load beam and that further extend underneath the flexure section of the flex circuit.

10. A suspension according to claim 1, wherein the load beam includes two generally oppositely disposed peripheral sides; and wherein the rear motion limiter includes at least two lateral wings, with at least one lateral wing extending from each of the peripheral sides of the load beam.

11. A suspension according to claim 1, further including a front motion limiter.

12. A suspension according to claim 11, wherein the front end limiter includes a generally L-shaped tab which is formed integrally with the load beam and which is disposed in proximity to a slider leading edge, opposite the rear motion limiter, for capturing a free end of the flexure when the flexure is in a negative pitch position.

13. A suspension according to claim 11, wherein the front end limiter is generally annularly shaped, and defines a central passageway which is outlined by an upper stop and a bottom stop;

wherein the front end limiter extends integrally from the load beam, and captures a free end of the flexure when the flexure is in a negative pitch position.

14. A head gimbal assembly including a suspension of the type supporting a slider and a flex circuit, the suspension comprising:

a load beam for supporting the flex circuit;

a resilient flexure secured to said load beam and supporting the slider;

the flex circuit including a flexure section;

said flexure including a trailing edge; and said load beam defining a rear motion limiter, wherein said rear motion limiter is separated from the flexure section of the flex circuit when the flexure is in a nominal position, and engages the flex circuit and limits the slider movement when the flexure is in a positive pitch position.

15. A head gimbal assembly according to claim 14, wherein said rear motion limiter extends intermediate the flex circuit and said flexure.

16. A head gimbal assembly according to claim 15, wherein said flex circuit includes a pattern of conductive traces that are formed on a compliant dielectric layer.

17. A head gimbal assembly according to claim 15, wherein said dielectric layer is a flat, flexible sheet of material adhered on one side to said pattern of conductive traces.

18. A head gimbal assembly according to claim 15, wherein said flex circuit includes a load beam section secured to said load beam; and said flexure section that is separated from said rear motion limiter by a gap.

19. A head gimbal assembly according to claim 18, wherein said flex circuit includes a trailing segment that engages said rear motion limiter when the slider journals beyond a predetermined distance from said load beam.

* * * * *